(12) United States Patent
Meier et al.

(10) Patent No.: US 7,852,519 B2
(45) Date of Patent: Dec. 14, 2010

(54) DUAL-TASKING DECODER FOR IMPROVED SYMBOL READING

(75) Inventors: Timothy P. Meier, Camillus, NY (US); Thomas P. Hawley, Skaneateles, NY (US); Andrew Longacre, Jr., Skaneateles, NY (US); Robert M. Hussey, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 915 days.

(21) Appl. No.: 11/702,313

(22) Filed: Feb. 5, 2007

(65) Prior Publication Data

US 2008/0186545 A1  Aug. 7, 2008

(51) Int. Cl.
*G06K 7/10* (2006.01)
*G06K 9/20* (2006.01)
*G06K 9/22* (2006.01)
*H04N 1/04* (2006.01)
*H04N 1/40* (2006.01)

(52) U.S. Cl. ............... 358/474; 358/448; 382/312; 382/313; 235/462.32

(58) Field of Classification Search ......... 382/306, 382/312, 313, 315, 318; 235/462.32, 462.39, 235/447, 440, 426.01; 358/474, 471, 505, 358/443, 448, 447
See application file for complete search history.

(56) References Cited

U.S. PATENT DOCUMENTS

| | | | |
|---|---|---|---|
| 3,582,884 A | 6/1971 | Shepard |
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,097,847 A | 6/1978 | Forsen et al. |
| 4,114,155 A | 9/1978 | Raab |

(Continued)

FOREIGN PATENT DOCUMENTS

AU    701057 B2    5/1997

(Continued)

OTHER PUBLICATIONS

International Search Report for International Patent Application No. PCT/US2008/001475, dated Jul. 29, 2008, 3 pages.

(Continued)

*Primary Examiner*—Jerome Grant, II
(74) *Attorney, Agent, or Firm*—Marjama Muldoon Blasiak & Sullivan LLP

(57) ABSTRACT

A symbol scanning and decoding device that is configured for capturing a series of images of a symbol over time and configured for providing a first (image processing) procedure that processes one or more of the series of images within a first period of time, and a second (image processing) procedure that processes one or more of the series of images within a second period of time, and where the first period of time is constrained to be less than or equal to, and the second period of time is not constrained to be less than or equal to, a period of time between a capture of an integral number of consecutive images of the series of images.

20 Claims, 7 Drawing Sheets

U.S. PATENT DOCUMENTS

| | | |
|---|---|---|
| 4,164,628 A | 8/1979 | Ward et al. |
| 4,210,802 A | 7/1980 | Sakai et al. |
| 4,291,410 A | 9/1981 | Caples et al. |
| 4,315,245 A | 2/1982 | Nakahara et al. |
| 4,435,822 A | 3/1984 | Spencer et al. |
| 4,445,118 A | 4/1984 | Taylor et al. |
| 4,488,678 A | 12/1984 | Hara et al. |
| 4,488,679 A | 12/1984 | Bockholt et al. |
| 4,500,776 A | 2/1985 | Laser |
| 4,538,060 A | 8/1985 | Sakai et al. |
| 4,542,528 A | 9/1985 | Sanner et al. |
| 4,561,089 A | 12/1985 | Rouse et al. |
| 4,570,057 A | 2/1986 | Chadima, Jr. et al. |
| 4,610,359 A | 9/1986 | Muller et al. |
| 4,628,532 A | 12/1986 | Stone et al. |
| 4,636,624 A | 1/1987 | Ishida et al. |
| 4,639,932 A | 1/1987 | Schiff |
| 4,644,523 A | 2/1987 | Horwitz |
| 4,646,353 A | 2/1987 | Tenge et al. |
| 4,653,076 A | 3/1987 | Jerrim et al. |
| 4,686,363 A | 8/1987 | Schoon |
| 4,690,530 A | 9/1987 | Fujino et al. |
| 4,710,817 A | 12/1987 | Ando et al. |
| 4,785,463 A | 11/1988 | Janc et al. |
| 4,791,446 A | 12/1988 | Ishida et al. |
| 4,794,239 A | 12/1988 | Allais |
| 4,807,256 A | 2/1989 | Holmes et al. |
| 4,818,856 A | 4/1989 | Matsushima et al. |
| 4,825,058 A | 4/1989 | Poland |
| 4,841,544 A | 6/1989 | Nuytkens |
| 4,874,936 A | 10/1989 | Chandler et al. |
| 4,877,949 A | 10/1989 | Danielson et al. |
| 4,896,029 A | 1/1990 | Chandler et al. |
| 4,901,073 A | 2/1990 | Kibrick |
| 4,908,500 A | 3/1990 | Baumberger et al. |
| 4,942,474 A | 7/1990 | Akimoto et al. |
| 4,998,010 A | 3/1991 | Chandler et al. |
| 5,019,699 A | 5/1991 | Koenck |
| 5,113,445 A | 5/1992 | Wang |
| 5,138,140 A | 8/1992 | Siemiatkowski et al. |
| 5,153,418 A | 10/1992 | Batterman et al. |
| 5,153,421 A | 10/1992 | Tandon et al. |
| 5,159,340 A | 10/1992 | Smith |
| 5,189,292 A | 2/1993 | Batterman et al. |
| 5,212,777 A | 5/1993 | Gove et al. |
| 5,223,701 A | 6/1993 | Batterman et al. |
| 5,227,614 A | 7/1993 | Danielson et al. |
| 5,235,167 A | 8/1993 | Dvorkis et al. |
| 5,237,163 A * | 8/1993 | Collins et al. .......... 235/462.25 |
| 5,245,695 A | 9/1993 | Basehore |
| 5,262,871 A | 11/1993 | Wilder et al. |
| 5,272,323 A | 12/1993 | Martino |
| 5,278,397 A | 1/1994 | Barkan et al. |
| 5,286,960 A | 2/1994 | Longacre, Jr. et al. |
| 5,294,783 A | 3/1994 | Hammond, Jr. et al. |
| 5,304,786 A | 4/1994 | Pavlidis et al. |
| 5,304,787 A | 4/1994 | Wang |
| 5,311,001 A | 5/1994 | Joseph et al. |
| 5,313,533 A | 5/1994 | Scott |
| 5,319,185 A | 6/1994 | Obata et al. |
| 5,331,176 A | 7/1994 | Sant'Anselmo et al. |
| 5,343,028 A | 8/1994 | Figarella et al. |
| 5,345,266 A | 9/1994 | Denyer et al. |
| 5,354,977 A | 10/1994 | Roustaei |
| 5,378,881 A | 1/1995 | Adachi et al. |
| 5,378,883 A | 1/1995 | Batterman et al. |
| 5,392,447 A | 2/1995 | Schlack et al. |
| 5,396,054 A | 3/1995 | Krichever et al. |
| 5,399,852 A | 3/1995 | Zheng et al. |
| 5,401,949 A | 3/1995 | Ziemacki et al. |
| 5,412,197 A | 5/1995 | Smith |
| 5,414,251 A | 5/1995 | Durbin |
| 5,418,862 A | 5/1995 | Zheng et al. |
| 5,420,409 A | 5/1995 | Longacre, Jr. et al. |
| 5,422,470 A | 6/1995 | Kubo et al. |
| 5,428,211 A | 6/1995 | Zheng et al. |
| 5,430,286 A | 7/1995 | Hammond, Jr. et al. |
| 5,430,472 A | 7/1995 | Curry |
| 5,446,271 A | 8/1995 | Cherry et al. |
| 5,461,425 A | 10/1995 | Fowler et al. |
| 5,463,214 A | 10/1995 | Longacre, Jr. et al. |
| 5,471,515 A | 11/1995 | Fossum et al. |
| 5,471,592 A | 11/1995 | Gove et al. |
| 5,477,042 A | 12/1995 | Wang |
| 5,478,997 A | 12/1995 | Bridgelall et al. |
| 5,478,999 A | 12/1995 | Figarella et al. |
| 5,479,515 A | 12/1995 | Longacre, Jr. |
| 5,481,098 A | 1/1996 | Davis et al. |
| 5,487,115 A | 1/1996 | Surka |
| 5,489,769 A | 2/1996 | Kubo et al. |
| 5,502,297 A | 3/1996 | Sherman |
| 5,504,524 A | 4/1996 | Lu et al. |
| 5,512,739 A | 4/1996 | Chandler et al. |
| 5,517,018 A | 5/1996 | Zheng et al. |
| 5,521,366 A | 5/1996 | Wang et al. |
| 5,524,068 A | 6/1996 | Kacandes et al. |
| 5,537,431 A | 7/1996 | Chen et al. |
| 5,545,886 A | 8/1996 | Metlitsky et al. |
| 5,565,669 A | 10/1996 | Liu |
| 5,567,934 A | 10/1996 | Zheng et al. |
| 5,569,901 A | 10/1996 | Bridgelall et al. |
| 5,572,006 A | 11/1996 | Wang et al. |
| 5,585,616 A | 12/1996 | Roxby et al. |
| 5,591,955 A | 1/1997 | Laser |
| 5,591,956 A | 1/1997 | Longacre, Jr. et al. |
| 5,598,007 A | 1/1997 | Bunce et al. |
| 5,600,119 A | 2/1997 | Dvorkis et al. |
| 5,610,387 A | 3/1997 | Bard et al. |
| 5,612,524 A | 3/1997 | Sant'Anselmo et al. |
| 5,621,203 A | 4/1997 | Swartz et al. |
| 5,637,849 A | 6/1997 | Wang et al. |
| 5,638,465 A | 6/1997 | Sano et al. |
| 5,640,202 A | 6/1997 | Kondo et al. |
| 5,663,549 A | 9/1997 | Katz et al. |
| 5,665,959 A | 9/1997 | Fossum et al. |
| 5,666,167 A | 9/1997 | Tults |
| 5,668,803 A | 9/1997 | Tymes et al. |
| 5,672,858 A | 9/1997 | Li et al. |
| 5,698,833 A | 12/1997 | Skinger |
| 5,699,447 A | 12/1997 | Alumot et al. |
| 5,702,059 A | 12/1997 | Chu et al. |
| 5,703,349 A | 12/1997 | Meyerson et al. |
| 5,710,417 A | 1/1998 | Joseph et al. |
| 5,723,823 A | 3/1998 | Bell |
| 5,723,853 A | 3/1998 | Longacre, Jr. et al. |
| 5,723,868 A | 3/1998 | Hammond, Jr. et al. |
| 5,726,435 A | 3/1998 | Hara et al. |
| 5,739,518 A | 4/1998 | Wang |
| 5,756,981 A | 5/1998 | Roustaei et al. |
| 5,763,864 A | 6/1998 | O'Hagan et al. |
| 5,773,806 A | 6/1998 | Longacre, Jr. |
| 5,773,810 A | 6/1998 | Hussey et al. |
| 5,774,357 A | 6/1998 | Hoffberg et al. |
| 5,780,832 A * | 7/1998 | Watanabe et al. ...... 235/462.26 |
| 5,780,834 A | 7/1998 | Havens et al. |
| 5,783,811 A | 7/1998 | Feng et al. |
| 5,784,102 A | 7/1998 | Hussey et al. |
| 5,811,774 A | 9/1998 | Ju et al. |
| 5,811,784 A | 9/1998 | Tausch et al. |
| 5,814,801 A | 9/1998 | Wang et al. |
| 5,814,803 A | 9/1998 | Olmstead et al. |
| 5,815,200 A | 9/1998 | Ju et al. |
| 5,818,028 A | 10/1998 | Meyerson et al. |
| 5,818,528 A | 10/1998 | Roth et al. |

| | | | | | | |
|---|---|---|---|---|---|---|
| 5,825,006 | A | 10/1998 | Longacre, Jr. et al. | 6,547,142 | B1 | 4/2003 | Goren et al. |
| 5,831,254 | A | 11/1998 | Karpen et al. | 6,552,323 | B2 | 4/2003 | Guidash et al. |
| 5,831,674 | A | 11/1998 | Ju et al. | 6,552,746 | B2 | 4/2003 | Yang et al. |
| 5,841,121 | A | 11/1998 | Koenck | 6,565,003 | B1 | 5/2003 | Ma |
| 5,841,126 | A | 11/1998 | Fossum et al. | 6,575,367 | B1 | 6/2003 | Longacre, Jr. |
| 5,867,594 | A | 2/1999 | Cymbalski | 6,578,766 | B1 | 6/2003 | Parker et al. |
| 5,867,595 | A | 2/1999 | Cymbalski | 6,585,159 | B1 | 7/2003 | Meier et al. |
| 5,875,108 | A | 2/1999 | Hoffberg et al. | 6,598,797 | B2 | 7/2003 | Lee |
| 5,877,487 | A | 3/1999 | Tani et al. | 6,606,171 | B1 | 8/2003 | Renk et al. |
| 5,900,613 | A | 5/1999 | Koziol et al. | 6,634,558 | B1 | 10/2003 | Patel et al. |
| 5,914,476 | A | 6/1999 | Gerst, III et al. | 6,637,658 | B2 | 10/2003 | Barber et al. |
| 5,917,171 | A | 6/1999 | Sasai et al. | 6,655,595 | B1 | 12/2003 | Longacre, Jr. et al. |
| 5,917,945 | A | 6/1999 | Cymbalski | 6,661,521 | B1 | 12/2003 | Stern |
| 5,920,477 | A | 7/1999 | Hoffberg et al. | 6,665,012 | B1 | 12/2003 | Yang et al. |
| 5,926,214 | A | 7/1999 | Denyer et al. | 6,666,377 | B1 | 12/2003 | Harris |
| 5,929,418 | A | 7/1999 | Ehrhart et al. | 6,672,511 | B1 | 1/2004 | Shellhammer |
| 5,932,862 | A | 8/1999 | Hussey et al. | 6,678,412 | B1 | 1/2004 | Shigekusa et al. |
| 5,942,741 | A | 8/1999 | Longacre, Jr. et al. | 6,685,095 | B2 | 2/2004 | Roustaei et al. |
| 5,949,052 | A | 9/1999 | Longacre, Jr. et al. | 6,698,656 | B2 | 3/2004 | Parker et al. |
| 5,949,054 | A | 9/1999 | Karpen et al. | 6,714,239 | B2 | 3/2004 | Guidash |
| 5,949,056 | A | 9/1999 | White | 6,714,665 | B1 | 3/2004 | Hanna et al. |
| 5,962,838 | A | 10/1999 | Tamburrini | 6,722,569 | B2 | 4/2004 | Ehrhart et al. |
| 5,965,863 | A | 10/1999 | Parker et al. | 6,729,546 | B2 | 5/2004 | Roustaei |
| 5,979,763 | A | 11/1999 | Wang et al. | 6,732,929 | B2 | 5/2004 | Good et al. |
| 5,979,768 | A | 11/1999 | Koenck | 6,732,930 | B2 | 5/2004 | Massieu et al. |
| 5,984,186 | A | 11/1999 | Tafoya | 6,736,321 | B2 | 5/2004 | Tsikos et al. |
| 5,986,297 | A | 11/1999 | Guidash et al. | 6,739,511 | B2 | 5/2004 | Tsikos et al. |
| 6,003,008 | A | 12/1999 | Postrel et al. | 6,742,707 | B1 | 6/2004 | Tsikos et al. |
| 6,012,640 | A | 1/2000 | Liu | 6,814,290 | B2 | 11/2004 | Longacre |
| 6,017,496 | A | 1/2000 | Nova et al. | 6,832,729 | B1 | 12/2004 | Perry et al. |
| 6,019,286 | A | 2/2000 | Li et al. | 6,834,806 | B2 | 12/2004 | Benedetti et al. |
| 6,053,407 | A | 4/2000 | Wang et al. | 6,837,432 | B2 | 1/2005 | Tsikos et al. |
| 6,064,763 | A | 5/2000 | Maltsev | 6,854,649 | B2 | 2/2005 | Worner et al. |
| 6,070,800 | A | 6/2000 | Fujita et al. | 6,857,570 | B2 | 2/2005 | Tsikos et al. |
| 6,082,619 | A | 7/2000 | Ma et al. | 6,858,159 | B2 | 2/2005 | Lyons |
| 6,082,621 | A | 7/2000 | Chan et al. | 6,860,428 | B1 | 3/2005 | Dowling et al. |
| 6,119,179 | A | 9/2000 | Whitridge et al. | 6,863,216 | B2 | 3/2005 | Tsikos et al. |
| 6,123,264 | A | 9/2000 | Li et al. | 6,877,665 | B2 | 4/2005 | Challa et al. |
| 6,129,278 | A | 10/2000 | Wang et al. | 6,982,800 | B1 | 1/2006 | Cavill et al. |
| 6,144,453 | A | 11/2000 | Hallerman et al. | 7,055,747 | B2 | 6/2006 | Havens et al. |
| 6,152,368 | A | 11/2000 | Olmstead et al. | 7,059,525 | B2 | 6/2006 | Longacre et al. |
| 6,155,491 | A | 12/2000 | Dueker et al. | 7,077,317 | B2 | 7/2006 | Longacre, Jr. et al. |
| 6,161,760 | A | 12/2000 | Marrs et al. | 7,077,321 | B2 | 7/2006 | Longacre, Jr. et al. |
| 6,170,749 | B1 | 1/2001 | Goren et al. | 7,080,786 | B2 | 7/2006 | Longacre, Jr. et al. |
| 6,173,894 | B1 | 1/2001 | Olmstead et al. | 7,086,596 | B2 | 8/2006 | Meier et al. |
| 6,176,428 | B1 | 1/2001 | Joseph et al. | 7,090,132 | B2 | 8/2006 | Havens et al. |
| 6,176,429 | B1 | 1/2001 | Reddersen et al. | D528,146 | S | 9/2006 | Fitch |
| 6,179,208 | B1 | 1/2001 | Feng | 7,104,456 | B2 | 9/2006 | Parker et al. |
| 6,186,404 | B1 | 2/2001 | Ehrhart et al. | 7,540,424 | B2 * | 6/2009 | Knowles et al. ........ 235/462.42 |
| 6,215,992 | B1 | 4/2001 | Howell et al. | 2002/0035715 | A1 * | 3/2002 | Hatakeyama ............... 714/788 |
| 6,219,182 | B1 | 4/2001 | McKinley | 2002/0039099 | A1 | 4/2002 | Harper |
| 6,230,975 | B1 | 5/2001 | Colley et al. | 2002/0039197 | A1 | 4/2002 | Hikichi |
| 6,264,105 | B1 | 7/2001 | Longacre, Jr. et al. | 2002/0039457 | A1 | 4/2002 | Helms et al. |
| 6,276,605 | B1 | 8/2001 | Olmstead et al. | 2002/0135683 | A1 | 9/2002 | Tamama et al. |
| 6,311,895 | B1 | 11/2001 | Olmstead et al. | 2002/0145043 | A1 | 10/2002 | Challa et al. |
| 6,315,204 | B1 | 11/2001 | Knighton et al. | 2002/0158127 | A1 | 10/2002 | Hori et al. |
| 6,329,139 | B1 | 12/2001 | Nova et al. | 2003/0042311 | A1 | 3/2003 | Longacre et al. |
| 6,347,163 | B2 | 2/2002 | Roustaei | 2003/0062418 | A1 | 4/2003 | Barber et al. |
| 6,360,948 | B1 | 3/2002 | Yang et al. | 2003/0085282 | A1 | 5/2003 | Parker et al. |
| 6,371,373 | B1 | 4/2002 | Ma et al. | 2003/0136843 | A1 * | 7/2003 | Ralph et al. ............. 235/462.33 |
| 6,385,352 | B1 | 5/2002 | Roustaei | 2003/0146283 | A1 | 8/2003 | Longacre et al. |
| 6,398,112 | B1 | 6/2002 | Li et al. | 2003/0218067 | A1 | 11/2003 | Parker et al. |
| 6,429,934 | B1 | 8/2002 | Dunn et al. | 2004/0004128 | A1 | 1/2004 | Pettinelli et al. |
| 6,443,360 | B1 | 9/2002 | Marchi et al. | 2004/0094627 | A1 | 5/2004 | Parker et al. |
| 6,462,842 | B1 | 10/2002 | Hamilton | 2004/0195332 | A1 | 10/2004 | Barber et al. |
| 6,486,911 | B1 | 11/2002 | Denyer et al. | 2004/0206821 | A1 | 10/2004 | Longacre et al. |
| 6,491,223 | B1 | 12/2002 | Longacre, Jr. et al. | 2004/0256464 | A1 | 12/2004 | Longacre et al. |
| 6,493,029 | B1 | 12/2002 | Denyer et al. | 2004/0256465 | A1 | 12/2004 | Longacre |
| 6,505,778 | B1 | 1/2003 | Reddersen et al. | 2004/0262392 | A1 | 12/2004 | Longacre et al. |
| 6,508,404 | B2 | 1/2003 | Hecht | 2004/0262394 | A1 | 12/2004 | Longacre et al. |
| 6,512,218 | B1 | 1/2003 | Canini et al. | 2004/0262395 | A1 | 12/2004 | Longacre, Jr. et al. |
| 6,525,827 | B2 | 2/2003 | Liu | 2004/0262396 | A1 | 12/2004 | Longacre et al. |
| 6,547,139 | B1 | 4/2003 | Havens et al. | 2004/0262399 | A1 | 12/2004 | Longacre, Jr. et al. |

| | | | | | |
|---|---|---|---|---|---|
| 2005/0056699 A1* | 3/2005 | Meier et al. .................. 235/454 | JP | 08506678 | 7/1996 |
| 2005/0103851 A1 | 5/2005 | Zhu et al. | JP | 10508133 A | 8/1998 |
| 2005/0161511 A1 | 7/2005 | Parker et al. | JP | 2895236 B2 | 3/1999 |
| 2006/0054704 A1 | 3/2006 | Fitch et al. | JP | 11515124 A | 12/1999 |
| 2006/0097054 A1 | 5/2006 | Biss et al. | JP | 2004511015 | 4/2004 |
| 2006/0126129 A1 | 6/2006 | Barber et al. | WO | WO-9304442 A1 | 3/1993 |
| 2006/0175413 A1 | 8/2006 | Longacre et al. | WO | WO-9314458 A1 | 7/1993 |
| 2006/0255150 A1 | 11/2006 | Longacre | WO | WO-9317397 A1 | 9/1993 |
| 2006/0283954 A1* | 12/2006 | Ralph et al. ............ 235/462.32 | WO | WO-9318478 A1 | 9/1993 |
| | | | WO | WO-9419766 A2 | 9/1994 |

FOREIGN PATENT DOCUMENTS

| | | |
|---|---|---|
| CA | 2156153 | 9/1994 |
| CA | 2190189 | 9/1994 |
| CA | 2190190 | 9/1994 |
| CA | 2234617 | 4/1997 |
| CN | 1204411 A | 1/1999 |
| DE | 69418598 T2 | 11/1999 |
| DE | 60123088 | 3/2007 |
| DK | 685092 T3 | 11/1999 |
| EP | 1323119 | 7/2003 |
| ES | 2134933 T3 | 10/1999 |
| GB | 2308267 A | 6/1997 |
| GB | 2343079 A | 4/2000 |
| GB | 2344486 A | 6/2000 |

| | | |
|---|---|---|
| WO | WO-9532580 A1 | 11/1995 |
| WO | WO-9701828 A1 | 1/1997 |
| WO | WO-9708647 A1 | 3/1997 |
| WO | WO-9715024 A1 | 4/1997 |
| WO | WO 02/29707 | 4/2002 |
| WO | WO-0229707 | 4/2002 |

OTHER PUBLICATIONS

Written Opinion of the International Searching Authority for International Patent Application No. PCT/US2008/001475, dated Jul. 29, 2008, 7 pages.

European Patent Office, Communication Pursuant to Article 94(3) EPC, dated May 21, 2010, 3 pgs.

* cited by examiner

DUAL-TASKING DECODER FOR IMPROVED SYMBOL READING

FIELD OF THE INVENTION

This invention relates generally to providing an improved symbol scanning and decoding device, and in particular to a symbol scanning and decoding device that is configured for capturing a series of images of a symbol over time and configured for providing a first (image processing) procedure that processes one or more of the series of images within a first period of time, a second (image processing) procedure that processes one or more of the series of images within a second period of time, and where the first period of time is constrained to be less than or equal to, and the second period of time is not constrained to be less than or equal to, a pre-determined period of time between a time of capture of two consecutive images of the series of images.

BACKGROUND OF THE INVENTION

Various organizations, including such as retail and manufacturing businesses, employ symbol (bar code) scanning devices for the purpose of identifying particular objects among a large plurality of symbol labeled objects. A bar code symbol is capable of storing information in a labeling format that image processing routines can recover more quickly, accurately and reliably than normal human-readable labeling methods.

SUMMARY OF THE INVENTION

This invention provides a symbol scanning and decoding device that is configured for capturing a series of images of a symbol over time and configured for providing a first (image processing) procedure that processes one or more of the series of images within a first period of time, and a second (image processing) procedure that processes one or more of the series of images within a second period of time, and where the first period of time is constrained to be less than or equal to, and the second period of time is not constrained to be less than or equal to, a pre-determined period of time between a time of capture of two consecutive images of the series of images.

BRIEF DESCRIPTION OF THE DRAWINGS

The objects and features of the invention can be better understood with reference to the claims and drawings described below. The drawings are not necessarily to scale; the emphasis is instead generally being placed upon illustrating the principles of the invention. Within the drawings, like reference numbers are used to indicate like parts throughout the various views. Differences between like parts may cause those like parts to be each indicated by different reference numbers. Unlike parts are indicated by different reference numbers.

DETAILED DESCRIPTION OF THE INVENTION

Figure 1:
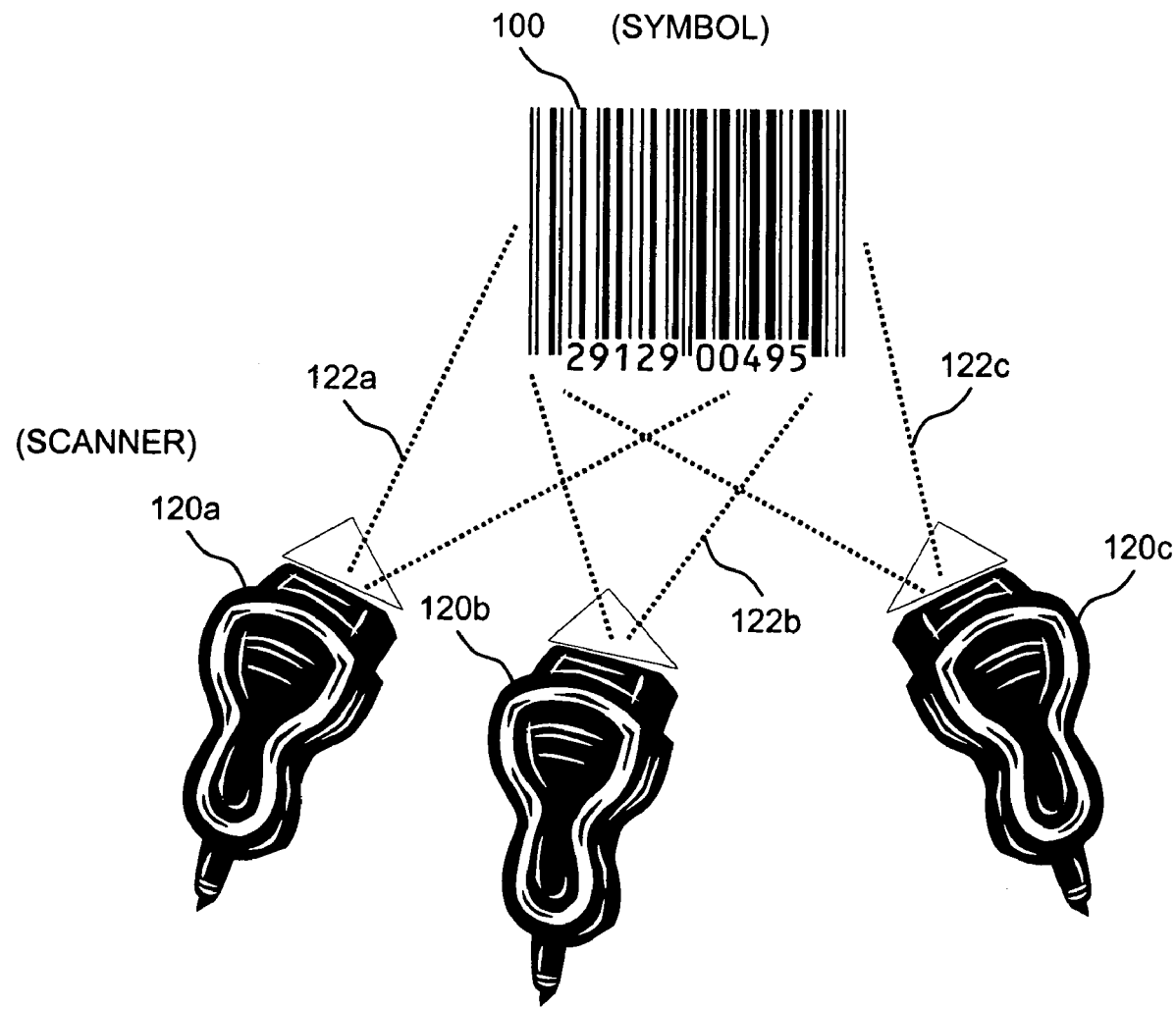
FIG. 1 illustrates a symbol being scanned by a hand held symbol scanner that is in motion and positioned at various locations and orientations with respect to the symbol, over a short period of time.

FIG. 1 illustrates a symbol 100 being scanned by a hand held symbol scanner 120, that is in motion and positioned at various locations and orientations 120a-120c with respect to the symbol 100, over a short period of time. The short period of time approximates 1-2 seconds. The hand held symbol scanner 120 is also referred to as a bar code scanner 120, imaging device 120 or as a scanner 120.

In accordance with the invention, the scanner 120 includes a trigger (not shown) that while pressed, causes the scanner 120 to attempt to decode a symbol within its field of view 122a-122c. When the trigger is pressed, the scanner 120 captures a series of (digital) images within its field of view 122a-122c over time. The scanner 120 typically generates an audio signal, such as a "beep" sound upon successfully decoding an image of the symbol that is included within at least one of the series of digital images, referred to as a current series of images, captured by the scanner 120. The scanner terminates the capture of the series of images (image acquisition mode) when an image of the series is decoded and/or until the trigger is released.

In some embodiments, the series of images are captured at a pre-determined frequency (schedule) over time. This frequency is also referred to as the frequency of image capture. Depending on the location and orientation of the field of view 122a-122c of the scanner 120, each captured image typically includes a unique digital representation of at least a portion of a graphical symbol 100.

In some embodiments, the scanner captures 58 images (frames) per second and as a result, captures one image within each of a series of 17 millisecond time intervals. In a typical use scenario, a user of the scanner 120 will direct the field of view 122a-122c of the scanner 120 towards the symbol 100 and press a trigger (not shown) to initiate an attempt by the scanner 120 to decode the symbol 100. The user can press the trigger and move (wave) the field of view 122a-122c of the scanner towards the symbol 100 while causing the scanner 120 to execute procedures to attempt to decode the symbol 100.

While the user presses the trigger and moves (waves) the scanner 120, the scanner 120 captures a series of 58 (approximately 60) images within approximately a second of time. The scanner 120 is configured to store within a memory a digital representation of each of the series of 60 images. In some embodiments, the procedures are implemented as software within the scanner 120 and are configured to read and process at least one or more of the 60 stored images of the series of images, also referred to as the current series of images.

In some embodiments, the scanner has only one processor (central processing unit (CPU). As a result, only one task can execute at one instant in time. In other embodiments, the scanner has more than one processor and as a result, more than one task can execute at one instant in time.

In some embodiments, the imaging device 120 can be configured to include one or more processors and to include software that executes on the one or more processors. In accordance with the invention, the software of the scanner includes a first (image processing) procedure and a second (image processing) procedure that are each configured to perform some processing of at least one of the current series of captured images. The first (image processing) procedure is configured to execute within a first elapsed period of time and the second (image processing) procedure is configured to execute within a second elapsed period of time.

In accordance with the invention, the first (image processing) procedure and the second (image processing) procedure are configured to perform processing on an image that could include a decodable (graphical) symbol. The "processing" of the image includes and is not limited to various actions, such as for example, symbol target inclusion verification, location, classification and orientation determination. In some circumstances, an image being processed may not include a symbol and consequently, the actions also include a determination of the absence of a decodable symbol from within the image. Such various actions, are not necessarily sufficient (or even necessary) to decode an image including a decodable (graphical) symbol.

In accordance with the invention, the first elapsed period of time has a duration that is constrained to be less than a first amount of time while a duration of the second elapsed period of time is not constrained to be less than the first amount of time.

As a result, in some embodiments, the first procedure is configured to execute with more frequency than the second procedure during a particular span of time, within which a series of images can be captured. Also, in some embodiments, the first procedure is configured to process, at least in part, more images than the second procedure during a span of time, within which a series of images can be captured.

In some embodiments, the first amount of time is set to a value and an initiation and/or duration of the first elapsed period of time is constrained, according to a schedule of image capture over time of the scanner 100. In some embodiments, the initiation (timing) and duration of the execution of the first (image processing) procedure, as defined by the initiation and duration of the first elapsed period of time, can be dependent and constrained upon a schedule of image capture as configured for the scanner 100, which is dependent upon the timing and frequency of image capture that is configured for the scanner 100.

In accordance with the invention, in some embodiments, the initiation of the execution of the first (image processing) procedure (first elapsed period of time) occurs as soon as practical upon the capture of every (Nth) image within the series of images. For example, in some embodiments, where (N=1) the initiation of the execution of the first (image processing) procedure occurs as soon as practical upon the capture of every image within the series of images. In other embodiments, where (N=2) for example, the first (image processing) procedure initiates upon the capture of every second (other) image within the series of images.

In accordance with the invention, the duration of the execution of the first (image processing) procedure (first elapsed period of time) is constrained (limited) to being less than or equal to a defined duration (first length of time), while a duration of the second procedure is not constrained to be less than the first length of time.

In some embodiments, the duration (length) of time, which defines the maximum duration of execution of the first (image processing) procedure (first elapsed period of time) can be constrained (limited) to be less than the time duration (first length of time) to capture an additional number of consecutive images (X).

In accordance with the invention, in some embodiments, the initiation of the execution of the first (image processing) procedure occurs as soon as practical upon the capture of every (Nth) image within a series of images. Therefore, the maximum duration of execution of the first (image processing) procedure (first elapsed period of time) must be constrained (limited) to be less than the duration (first length of time) to capture an additional number of consecutive images (X) in such a way that (X<=N).

Therefore, in the example case where N=1, and the first (image processing) procedure is initiated to execute as soon as practical upon the capture of every image within a series of images, the maximum duration of execution of the first (image processing) procedure (first elapsed period of time) cannot exceed the duration (length) of time to capture an additional (X=1) image. Also, in the example case where N=2, and the first (image processing) procedure is initiated to execute as soon as practical upon the capture of every second image within a series of images, the maximum duration of execution of the first (image processing) procedure (first elapsed period of time) cannot exceed the duration (length) of time to capture an additional (X=2) image.

Practically, the first elapsed period of time is substantially less than the duration (first length of time) to capture an additional number of consecutive images (X) where (X<=N), in order to not consume and to make available processor time for execution of the second (image processing) procedure during the second elapsed time period.

For embodiments, where initiation of the execution of the first (image processing) procedure occurs upon the capture of every (N=2) second image, the execution of the second (image processing) procedure is interrupted with half the frequency as compared to when (N=1) and where interruption occurs upon the capture of every image. Where initiation of the execution of the first (image processing) procedure occurs upon the capture of every (N=3) third image, the execution of the second (image processing) procedure is interrupted with a third of the frequency than when (N=1).

With respect to the above described embodiment of 58 images per second, a duration (length) of time to capture a single image, within the series of images, is approximately 17 milliseconds. The first (image processing) procedure is configured to process, at least in part, each of some or all of the series of images, to support a particular symbol decoding operation. In some embodiments, the first (image processing) procedure processes each of the series of images in an order in which they are captured.

The second elapsed period of time has a duration (length) of time that varies, but unlike that of the first (image processing) procedure, is not constrained to be less than, and can substantially exceed the duration (length) of time that is sufficient to capture the next consecutive image, in a series of images, at the pre-determined frequency. As a result, the duration of the second (image processing) procedure may substantially exceed the duration of the first (image processing) procedure. Unlike the first (image processing) procedure, the second (image processing) procedure is not configured to optionally process all of a current series of images.

The first (image processing) procedure is configured to perform processing upon a captured image via performance of a first set of one or more actions during its execution while directing control of at least one processor. The first set of actions is configured to perform at least a portion of an attempt of successfully decoding an image of at least one graphical symbol 100. The first set of actions is not necessarily configured to decode the image, but can, in some embodiments, constitute a subset of actions required to decode the image. The execution of the first (image processing) procedure occurs during and between the starting and ending boundary of a first elapsed period of time.

The first (image processing) procedure is configured to input and process at least one, and often many, if not all, of a current series of images, depending on the particular symbol decoding scenario. In some embodiments, the first (image processing) procedure is further configured to output information including a characterization of each image as a result of processing that image. The information, also referred to as an image processing summary for each image, is communicated in a manner that is accessible to the second (image processing) procedure.

The image processing summary information, associated with each of one or more images of the current series, also includes a description of a contribution of actions performed, and results of those actions realized, by the first (image processing) procedure to further an attempt of successfully decoding each of the one or more images. The information provided by the image processing summary information is consolidated and accumulated for a particular image within the series of images. The second (image processing) procedure can employ the consolidated and accumulated information to reduce the decoding effort required by the second (image processing) procedure when attempting to decode that image.

The contribution of actions includes a description of results of one or more reads by the first (image processing) procedure of at least a portion of each associated image. The reads often identify and grade regions of interest within the image being processed. The contribution of actions further includes a rating that is configured to have a correlation with a likelihood of successfully decoding each associated image. If the first (image processing) procedure has completed a successful decoding of an associated image, the contribution of actions describes the completion of the successful decoding. A plurality of images within a series of images can be rank ordered based upon a rating that is assigned to each image within the series.

The second (image processing) procedure, during its execution, is configured to perform processing of at least one of the series of captured images. The processing includes a second set of one or more actions that are performed while directing control of at least one processor of the scanner 120. The second set of actions is configured to perform at least a portion of an attempt of successfully decoding of an image of at least one graphical symbol. The execution of the second (image processing) procedure occurs during the second elapsed period of time.

Processing of an image by the second (image processing) procedure includes an attempt to more rigorously (completely, broadly, thoroughly and carefully) decode the image as compared to any decoding attempt that would likely be made by the first (image processing) procedure. As a result, processing of an image by the second (image processing) procedure typically requires substantially more time to complete than the processing of the same image by the first (image processing) procedure.

Because the length of the second elapsed period of time is likely to substantially exceed the longest possible first elapsed period of time, when executing within a single processor configuration, the second (image processing) procedure will likely be interrupted by one or more executions of the first (image processing) procedure and the second (image processing) procedure will not exclusively execute between the initiation and completion of a second elapsed period of time.

When executing within a multiple processor configuration, the first and second (image processing) procedures can be assigned to separate processors and can execute independently and without interruption between each other.

If the second (image processing) procedure's attempt to decode an image fails, another image of the current series of images is selected by the second (image processing) procedure or other software, to initiate another decoding attempt. If the second (image processing) procedure's attempt to decode an image succeeds, the results of the decoding of the captured image are likely to be a correct decoding of the image of the symbol 100 associated with the decoded image. As a result, decoding of the image of the symbol 100 is complete and no further image capture, nor decoding of another captured image, is required to decode the image of the symbol 100.

Figure 2A:
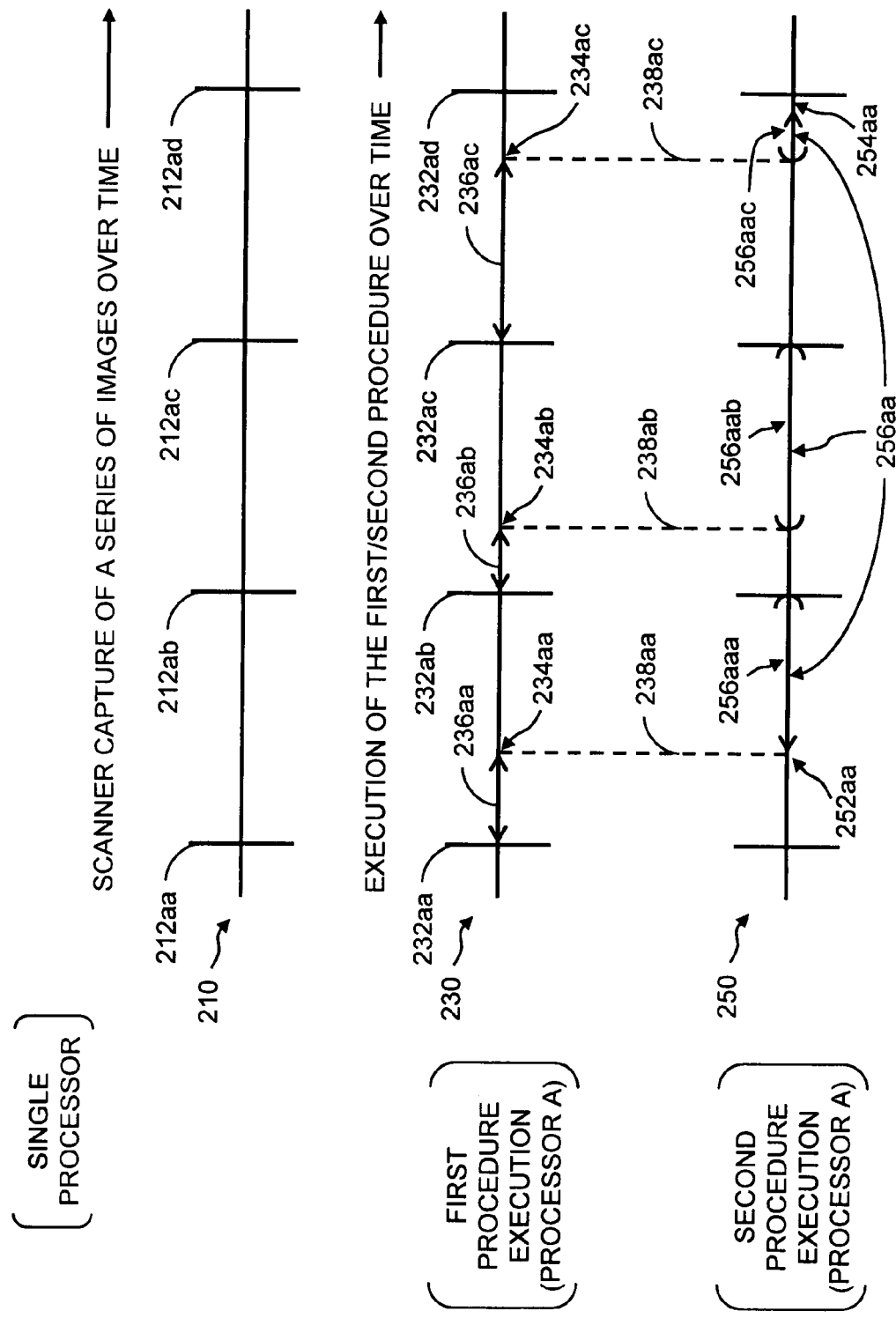
FIG. 2A illustrates a single processor symbol decoding scenario that includes capture of a series of (4) images of a symbol by the scanner.

FIG. 2A illustrates a single processor symbol decoding scenario that includes capture of a series of (4) images of a symbol 100 and multiple executions of the first (image processing) procedure by the scanner 120. A time line 210 illustrates a plurality of points in time 212aa-212ad for each completion of a capture of one of the series of (4) distinct images of the symbol 100, also referred to as the current series of images. Any motion of the scanner 120 that occurs while capturing the series of images causes each image of the series to be unique and likely different from other images of the same series of images.

As shown, a first image of the current series is captured at a first time 212aa, a second image of the current series is captured at a second time 212ab, a third image of the current series is captured at a third time 212ac, and a fourth image of the current is captured at a fourth time 212ad.

A time line 230 illustrates execution activity of the first (image processing) procedure over time. At or shortly after the time of capture 212aa of the first image, execution of the first (image processing) procedure initiates at a time 232aa and completes at a time 234aa for processing of the first image over a first elapsed period of time 236aa via employment of at least one first processor. At or shortly after the time of capture 212ab of the second image, execution of the first (image processing) procedure initiates at a time 232ab and completes at a time 234ab for processing of the second image over a first elapsed period of time 236ab via employment at least one first processor. At or shortly after the time of capture 212ac of the third image, execution of the first (image processing) procedure initiates at a time 232ac and completes at a time 234ac for processing of the third image over a first elapsed period of time 236ac via employment at least one first processor.

A time line 250 illustrates execution activity over time of the second (image processing) procedure. At or shortly after the time of completion 234aa of the first elapsed period of time 236aa of the first (image processing) procedure, the second (image processing) procedure initiates at a time 252aa and completes at a time 254aa for processing of the first image over a second elapsed period of time 256aa via employment of at least one first processor.

In this embodiment, the scanner has only one processor. As a result, only a single procedure can (exclusively) execute at one instant in time. In this scenario, the first (image processing) procedure has priority over the second (image processing) procedure and periodically interrupts the execution of the second (image processing) procedure. The second (image processing) procedure does not interrupt the first (image processing) procedure. Also in this scenario, no other procedures are shown to interrupt the first or the second (image processing) procedures.

In other embodiments, the scanner has more than one processor and as a result, more than one procedure can execute at any one instant in time. As a result, the execution of the first and second (image processing) procedures can occur and overlap at the same one instant in time.

In a single processor embodiment, the second (image processing) procedure is competing with the first (image processing) procedure, and possibly other procedures, for scheduling of a period of time to control the single processor. Notice that each of the first elapsed periods of time 236ab and 236ac, overlap at least partially, a period of time between the initiation and completion of the second elapsed period of time 256aa. The second elapsed period of time initiates at time 252aa and completes at 254aa. The first elapsed period of time 236aa of the first (image processing) procedure initiates and completes before the initiation of the second elapsed time period 252aa of the second (image processing) procedure. Hence, one execution of the first (image processing) procedure initiates and completes before the execution of the second (image processing) procedure. As shown, the second (image processing) procedure is periodically interrupted and overlapped by complete iterations of the first (image processing) procedure.

As shown, in this symbol decoding scenario, the first (image processing) procedure does not successfully decode the first image during the first elapsed period of time 236aa and does not successfully decode the second image during the next instance of the first elapsed period of time 236ab, but does successfully decode the third image during the third instance of the first elapsed period of time 236ac.

Upon a completion of processing of each image of the current series of images, the first (image processing) procedure communicates information summarizing the results of processing each image 238aa-238ac, also referred to as an image processing summary, whether the processing of each image is successful or unsuccessful. Upon an unsuccessful decoding attempt of the first image, the first (image processing) procedure communicates an image processing summary 238aa in a manner that is accessible to the second (image processing) procedure. Upon an unsuccessful decoding attempt of the second image, the first (image processing) procedure communicates an image processing summary 238ab in a manner that is accessible to the second (image processing) procedure.

Upon successfully decoding the third image, the first (image processing) procedure communicates an image processing summary 238ac of the third image to the second (image processing) procedure at time 234ac, that includes an indication of the successful decoding of the third image.

Optionally, the second (image processing) procedure interrupts its processing of an image to read each image processing summary 238aa-238ac that has been communicated from the first (image processing) procedure. In response to receiving the image processing summary 238ac for the third image at time 234ac, the second (image processing) procedure reads the image processing summary 238ac and determines that the first (image processing) procedure has successfully decoded one of the images of the current series of images, and terminates at time 254aa, which occurs shortly after time 234ac.

In some embodiments, operating system software residing within the scanner 120 controls scheduling of the first processor via a scheduling algorithm. The first (image processing) procedure and the second (image processing) procedure compete with each other and other tasks for scheduling of time to direct control of the processor.

In a typical processor scheduling scenario, multiple tasks wait to be scheduled to direct control of the first processor (exclusively and continuously execute) for at least a small period of time, also referred to as a time slice or time segment. Depending upon the scheduling algorithm employed in association with the first processor, the first (image processing) procedure may be continuously scheduled as one individually continuous time segment or non-continuously scheduled as a non-contiguous series of more than one individually continuous time segments, within one or more of the first elapsed periods 236aa, 236ab and 236ac.

Figure 2B:
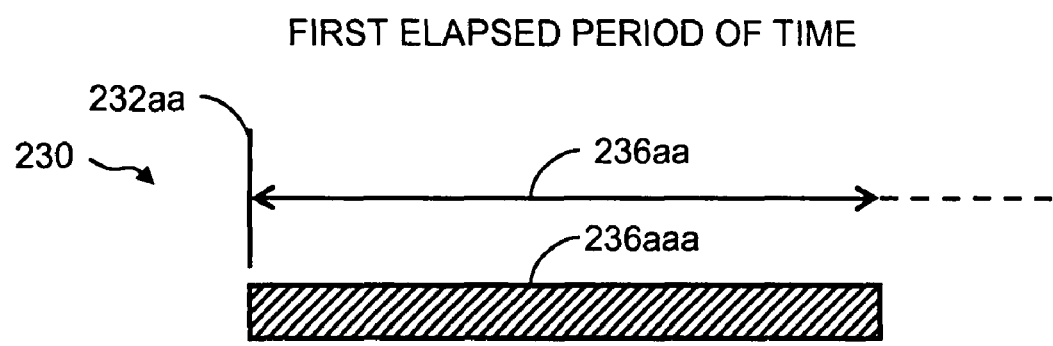
FIG. 2B illustrates a single tasking processor scheduling scenario for a single processor that occurs during the first elapsed period of time of FIG. 2A.

FIG. 2B illustrates a single tasking processor scheduling scenario for a single processor that occurs during the first elapsed period of time of FIG. 2A. In this processor scheduling scenario, the first elapsed period of time 236aa includes one time segment, also referred to as a continuous time segment, that includes continuous execution of one task. During this one continuous time segment 236aa, the first (image processing) procedure is the only task to execute on the processor within the first elapsed period of time. The first (image processing) procedure exclusively executes on the one processor and is said to "hog" the processor for the entire duration of the first elapsed period of time 236aa.

As shown, execution of the first (image processing) procedure is initiated, un-interrupted and completed within one continuous time segment 236aa. In other processor scheduling scenarios, the first elapsed period of time 236aa may instead include a non-contiguous (non-abutting) series of one or more separate and continuous time segments within which exclusive execution of the first (image processing) procedure occurs.

Figure 2C:
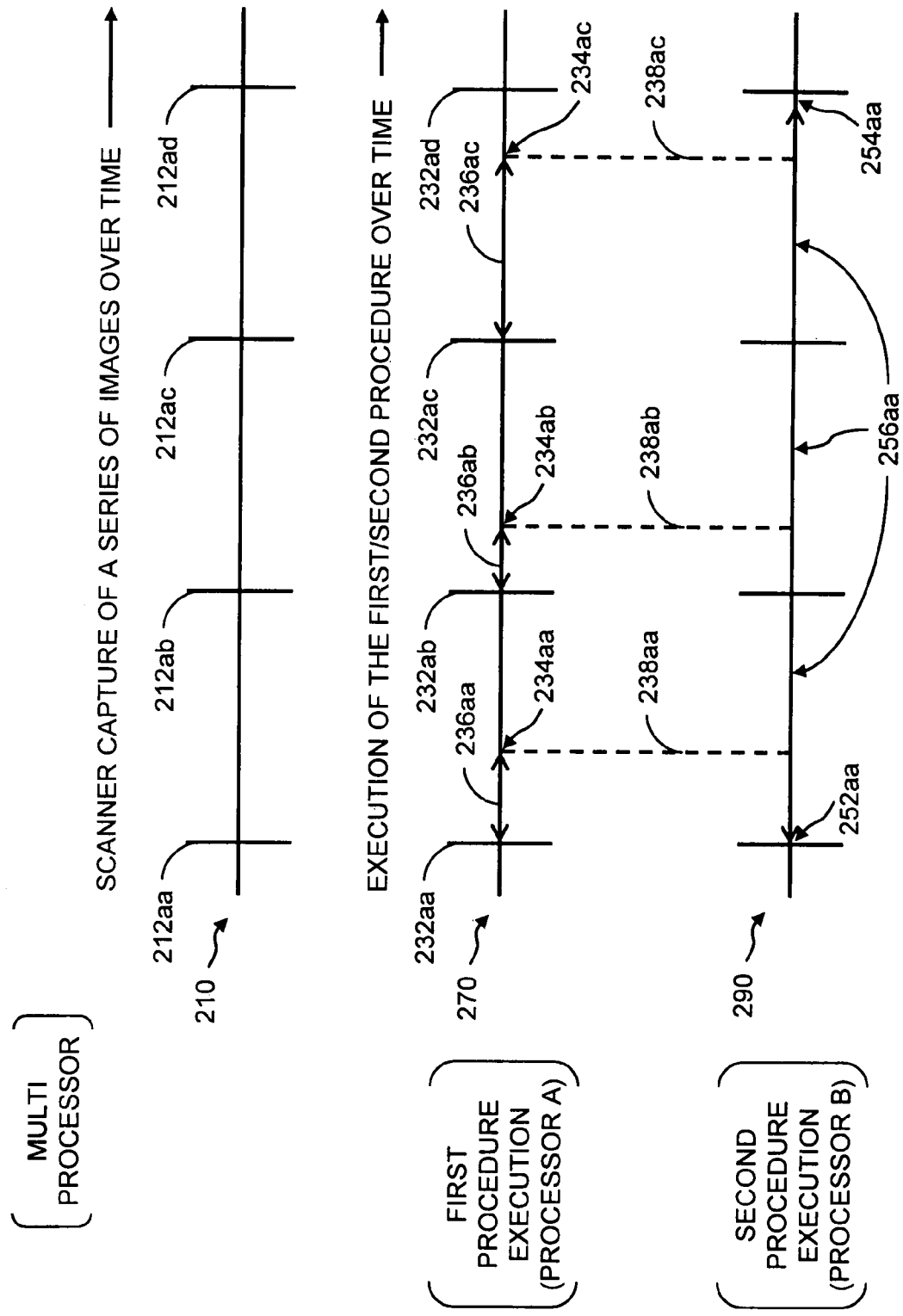
FIG. 2C illustrates a multiple processor symbol decoding scenario that includes capture of a series of (4) images of a symbol by the scanner.

FIG. 2C illustrates a multiple processor symbol decoding scenario that includes capture of a series of (4) images of a symbol 100 and multiple executions of the first (image processing) procedure by the scanner 120. As also shown in FIG. 2A, a time line 210 illustrates a plurality of points in time 212aa-212ad for each completion of a capture of one of the series of (4) distinct images of the symbol 100, also referred to as the current series of images.

As also shown in FIG. 2A, a time line 270 illustrates execution activity of the first (image processing) procedure over time. At or shortly after the time of capture 212aa of the first image, execution of the first (image processing) procedure initiates at a time 232aa and completes at a time 234aa for processing of the first image over a first elapsed period of time 236aa via employment of the first processor (Processor A). At or shortly after the time of capture 212ab of the second image, execution of the first (image processing) procedure initiates at a time 232ab and completes at a time 234ab for processing of the second image over a first elapsed period of time 236ab via employment of a first processor (Processor A). At or shortly after the time of capture 212ac of the third image, execution of the first (image processing) procedure initiates at a time 232ac and completes at a time 234ac for processing of the third image over a first elapsed period of time 236ac via employment of the first processor (Processor A).

As also shown in FIG. 2A, a time line 290 illustrates execution activity of the second (image processing) procedure over time. Unlike that shown in FIG. 2A, the execution of the second (image processing) procedure employs a second processor (Processor B) and as a result, is not delayed until at or shortly after the time of completion 234*aa* of the first elapsed period of time 236*aa* of the first (image processing) procedure. Instead, for the multi-processor embodiment, the second (image processing) procedure initiates at a time 252*aa*, which is now earlier than that shown in FIG. 2A, and now coincides at or shortly after the time of image capture 212*aa*. As also shown in FIG. 2A, the execution of the second (image processing) procedure completes at a time 254*aa* for processing of the first image over a second elapsed period of time 256*aa* via employment of the second processor (Processor B).

In this embodiment, the scanner has multiple (at least two) processors. As a result, multiple tasks (each including decoding and/or non-decoding procedures) can execute at one instant in time. In this scenario, the first (image processing) procedure does not interrupt the execution of the second (image processing) procedure and the second (image processing) procedure first (image processing) procedure. As also shown in FIG. 2A, no other tasks are shown to interrupt the first or the second (image processing) procedures.

Like that which was shown in FIG. 2A, the symbol decoding scenario shown in 2C shows that the first (image processing) procedure does not successfully decode the first image during the first elapsed period of time 236*aa* and does not successfully decode the second image during the next first elapsed period of time 236*ab*, but does successfully decode the third image during the second next first elapsed period of time 236*ac*.

Like that which was shown in FIG. 2A, the symbol decoding scenario shown in 2C shows that upon a completion of processing of each image of the current series of images, the first (image processing) procedure communicates information summarizing the results of processing each image 238*aa*-238*ac*, also referred to as an image processing summary, whether the processing of each image is successful or unsuccessful.

Upon successfully decoding the third image, the first (image processing) procedure communicates an image processing summary 238*ac* of the third image to the second (image processing) procedure at time 234*ac*, that includes an indication of the successful decoding of the third image.

Optionally, the second (image processing) procedure interrupts its processing of an image to read each image processing summary 238*aa*-238*ac* that has been communicated from the first (image processing) procedure. In response to receiving the image processing summary 238*ac* for the third image at time 234*ac*, the second (image processing) procedure reads the image processing summary 238*ac* and determines that the first (image processing) procedure has successfully decoded one of the images of the current series of images, and terminates at time 254*aa*, which occurs shortly after time 234*ac*.

In a typical processor scheduling scenario, for a single or multiple processor configuration, multiple tasks (each including decoding and/or non-decoding procedures) wait to be scheduled to direct control of at least one processor (exclusively and continuously execute) for at least a small period of time, also referred to as a time slice or time segment. Depending upon the scheduling algorithm employed in association with the at least one processor, the first (image processing) procedure may be continuously scheduled as a single task in one individually continuous time segment or non-continuously scheduled as one of many tasks within one or more of the first elapsed periods 236*aa*, 236*ab* and 236*ac*.

Figure 2D:
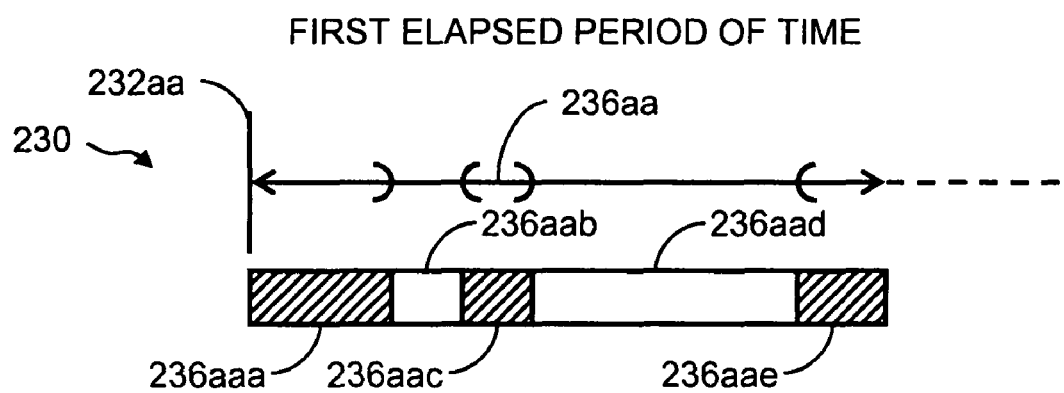
FIG. 2D illustrates a multi-tasking processor scheduling scenario that occurs within the boundaries of the first elapsed period of time of FIG. 2A

FIG. 2D illustrates a multi-tasking processor scheduling scenario for one processor, that occurs within the boundaries of the first elapsed period of time of FIG. 2A. In contrast to that shown in FIG. 2B, the first elapsed period of time 236*aa* instead includes within its boundaries, the execution of multiple tasks (including decoding and/or non-decoding procedures and possibly other tasks) within a non-contiguous (non-abutting) series of separate and continuous time segments. The other tasks may or may not include procedures that perform symbol decoding and may or may not include execution of the second (image processing) procedure.

In this embodiment, unlike that shown in FIG. 2B, the first (image processing) procedure is not the only task to execute on the processor within the first elapsed period of time. Instead, the first elapsed period of time includes execution of other tasks, that may or may not perform decoding, in addition to the execution of the first (image processing) procedure. Like that shown in FIG. 2B, only one task exclusively executes within any one time segment and at any one instant in time on any one processor.

In this multi-tasking processor scheduling scenario, the first elapsed period of time 236*aa* includes (3) continuous time segments 236*aaa*, 236*aac* and 236*aae* within which the first (image processing) procedure executes.

As shown, execution of the first (image processing) procedure within the boundaries of the first elapsed time period 236*aa*, is initiated at the start of time segment 236*aaa* and suspended (interrupted) at the end of time segment 236*aaa*, which coincides with the start of time segment 236*aab*. Execution of the first (image processing) procedure is continuous and un-interrupted through time segment 236*aaa*. Execution of one or more other tasks occurs during the time segment 236*aab*. Execution of the other tasks may or may not perform decoding and may or may not include execution of the second (image processing) procedure.

Execution of the first (image processing) procedure within the boundaries of the first elapsed time period 236*aa*, is un-suspended at the start of time segment 236*aac* and is again suspended (interrupted) at the end of time segment 236*aac*, which coincides with the start of time segment 236*aad*. Execution of the first (image processing) procedure is continuous and un-interrupted through time segment 236*aac*. Execution of one or more other tasks occurs during time segment 236*aad*. Those other tasks may or may not perform decoding and may or may not include execution of the second (image processing) procedure.

Execution of the first (image processing) procedure within the boundaries of the first elapsed time period 236*aa*, is again un-suspended at the start of time segment 236*aae* and is again suspended (interrupted) at the end of time segment 236*aae*. Execution of the first (image processing) procedure is continuous and un-interrupted through time segment 236*aae*. Unlike the other time segments 236*aaa* and 236*aac*, execution of the first (image processing) procedure is terminated (completed) at the end of time segment 236*aae*.

During the one or more individual time segments, in this scenario shown as 236*aab* and 236*aad*, the processor is employed for purposes other than executing the first (image processing) procedure. These purposes can include execution of a high priority interrupt handler, other high priority tasks, and/or execution of other tasks (each including decoding and/or non-decoding procedures) associated with the operation of the scanner 120, including the execution of the second (image processing) procedure.

The series of time segments 236*aaa*, 236*aac* and 236*aae* are said to be non-contiguous (non-abutting) in that the execution of the first (image processing) procedure is interrupted by the execution of at least one other task between each time segment of the non-contiguous series. A continuous time segment is a time segment within which one task executes without interruption. Like the first (image processing) procedure, the second (image processing) procedure can and typically does execute within a non-contiguous series of more than one continuous time segments, especially for a single processor configuration.

Unlike what is shown in FIG. 2A, in this multi-tasking processor scheduling scenario, execution of the second (image processing) procedure could initiate earlier than shown in FIG. 2A and occur during one of the individual time segments 236aab or 236aad which start about midway through the first elapsed period of time 236aa. The second (image processing) procedure can further execute during one or more other individually continuous time segments (not shown) outside of and after the first elapsed period of time 236aa.

Like what is shown in FIG. 2A, in this multi-tasking processor scheduling scenario, the second (image processing) procedure continues to execute within the second elapsed period of time 256aa and long after the end of the first elapsed periods of time 236aa-236ab. After time segment 236aae, the second (image processing) procedure continues to execute during one or more other individually continuous time segments (not shown) outside of and after the first elapsed period of time 236aa. The second (image processing) procedure will continue to execute within the second elapsed period of time 256aa which terminates at 254aa, shortly after the second (image processing) procedure receives information 238ac from the first (image processing) procedure indicating that the third image has been successfully decoded by the first (image processing) procedure at time 234ac.

As a result, execution of the second (image processing) procedure through its last contiguous time segment (not shown) completes a time 254aa. Hypothetically, like described for FIG. 2A, if the first (image processing) procedure had not successfully decoded the third image, the second (image processing) procedure would have continued to process the first image until it successfully decoded the first image, or until a the second (image processing) procedure has made a determination that it would not successfully decode the first image, or until the first (image processing) procedure successfully decodes any of the current series of images.

The first 236aa and second 256aa elapsed periods of time, are said to overlap when the starting or ending boundary of one elapsed period of time is located within the starting and ending boundaries of the other elapsed period of time.

But note that two separate time segments 236aaa and 236aab, representing the exclusive execution of the first (image processing) procedure and execution of other tasks respectively, cannot overlap each other at any point in time for the single processor configuration. Separate time segments representing the execution of separate tasks can only overlap when executed on separate processors at the same time.

Hypothetically, if the first (image processing) procedure had not successfully decoded the third image during the first elapsed time period 236ac, the second (image processing) procedure would have continued to further process the first image until it successfully decoded the first image, or until the second (image processing) procedure made a determination that it would not successfully decode the first image, or until the first (image processing) procedure successfully decoded any of the other current series of images.

Upon a successful decoding of the first image by either the first or the second (image processing) procedure, both the first and second (image processing) procedures terminate and cease attempting to further decode any images of the current series of images.

Upon a successful decoding of the first image by either the first or the second (image processing) procedure, both the first and second (image processing) procedures terminate and cease attempting to further decode any images of the current series of images.

Figure 3:
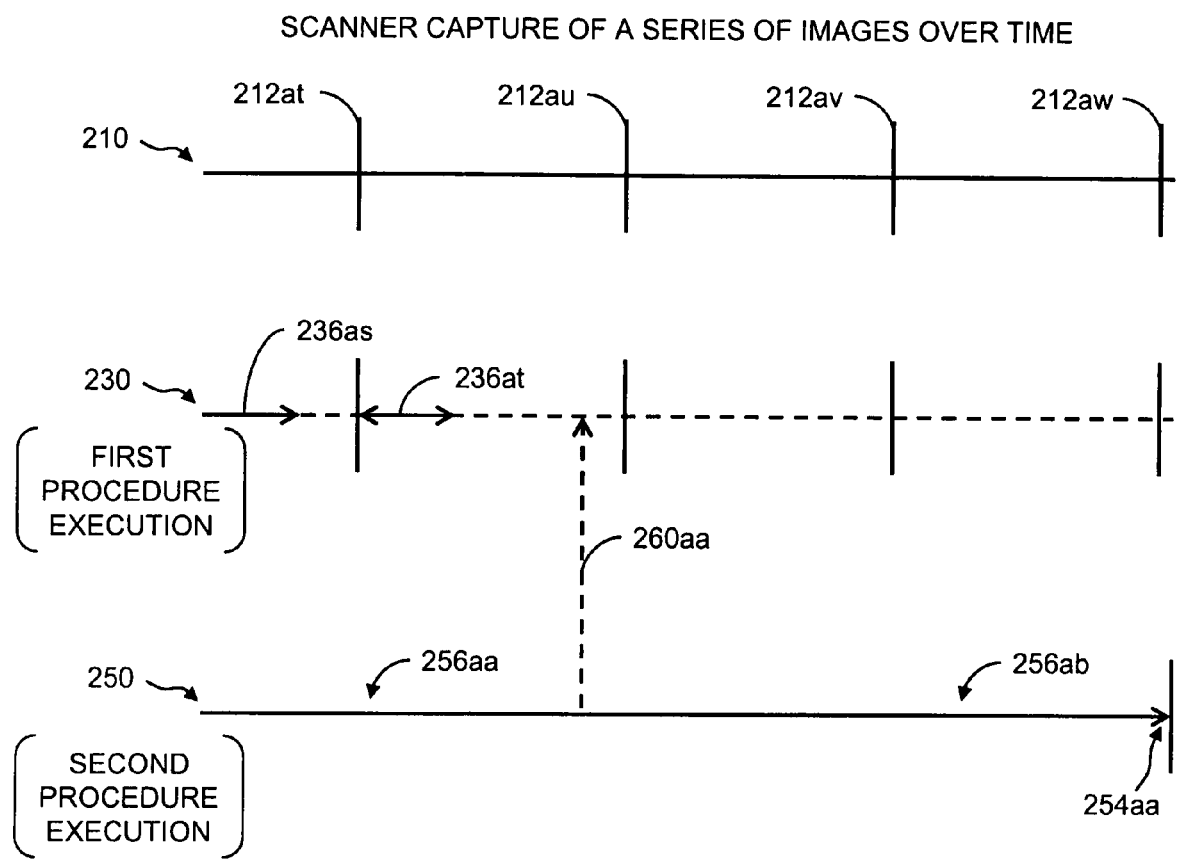
FIG. 3 illustrates a variation of the symbol decoding scenario of FIG. 2A including termination of execution of the first (image processing) procedure in response to receiving a communication of an image processing forecast from the second (image processing) procedure.

FIG. 3 illustrates a variation of the symbol decoding scenario of FIG. 2A including termination of the execution of the first (image processing) procedure in response to receiving a communication of an image processing forecast 260aa from the second (image processing) procedure.

In this scenario, the first (image processing) procedure has been unable to successfully decode any of the approximately first 46 images of the current series of images. The first (image processing) procedure has completed processing of the forty fifth image of the series during first elapsed period of time 236as and the forty sixth image of the series during first elapsed period of time 236at.

While the first (image processing) procedure has been processing the first 46 images, the second (image processing) procedure has been processing the first image of the series and has arrived at a determination indicating that it will successfully decode the image, being the first image of the series that it is currently processing.

Accordingly, the second (image processing) procedure communicates a (favorable) image processing forecast 260aa to the first (image processing) procedure. The (favorable) image processing forecast indicates that there is a sufficiently high likelihood that the second (image processing) procedure will successfully decode the image that it is currently processing.

In some embodiments, the first (image processing) procedure responds to receiving the (favorable) image processing forecast by terminating execution for processing a current image of the series and ceasing any further attempt to process any other images of the series.

In other embodiments, execution of the first (image processing) procedure is suspended for processing a current image and for attempting to process any other images of the series of images, to make available more processor time to the second (image processing) procedure or other procedures, until successful decoding of the current image by the second (image processing) procedure actually occurs at time 254aa. In this embodiment, the first (image processing) procedure effectively "blocks" until further notice, based upon a determination of the second (image processing) procedure.

In some circumstances, the second (image processing) procedure communicates an (unfavorable) image processing forecast 260aa to the first (image processing) procedure that indicates an insufficient likelihood that the second (image processing) procedure will successfully decode the image that it is currently processing. This circumstance can take place independent of any prior communication or after communicating a prior (favorable) image processing forecast 260aa with respect to the same image currently being processed.

Regardless of whether the second (image processing) procedure communicates an image processing forecast 260aa while processing an image, the second (image processing) procedure communicates an image processing summary (not shown) that is accessible to the first (image processing) procedure upon completion of the attempt to decode the image currently being processed, whether the attempt to decode the image is successful or not successful.

If the image processing forecast sent from the second (image processing) procedure to the first (image processing) procedure indicates that the decode will be successful as is shown in FIG. 3, the first (image processing) procedure responds to receiving the image processing forecast by terminating execution and ceasing any further attempt to process any other images of the series of images. In other embodiments, execution of the first (image processing) procedure is suspended, to make available more processor time, until successful decoding of the current image by the second (image processing) procedure actually occurs at time 254aa.

Should the second (image processing) procedure later become unable to successfully decode the current image of the series of images, it will communicate an image processing summary (not shown) to the first (image processing) procedure indicating an unsuccessful decoding outcome of the first image. In response, execution of the first (image processing) procedure if suspended, is un-suspended and will continue to process images of the current series of images that have not yet been processed.

In some embodiments, the second (image processing) procedure can elect to ignore communications from the first (image processing) procedure or cause suspension or termination of the first (image processing) procedure upon generating the image processing forecast. This aspect of the invention exploits a higher expected reliability of the results of the second (image processing) procedure, as compared to the expected reliability of the results of the first (image processing) procedure, upon successfully decoding an image of the current series.

Alternatively, the image processing forecast 260aa can indicate a sufficiently low likelihood of successfully decoding the current image. In response, the second (image processing) procedure self terminates and selects another image to process. In this scenario, the second (image processing) procedure evaluates any image processing summary that was communicated from the first (image processing) procedure regarding any of the images within the current series of images.

Upon evaluation of available image processing summary information associated with each of one or more images of the current series, the second (image processing) procedure selects and attempts to decode another image of the current series. The second (image processing) procedure can opt to select one image of the current series of images that was captured prior to self termination of the second (image processing) procedure or can opt to wait and select an image of the current series that has not yet been captured by the scanner 120.

Typically, the image processing summary includes information that reduces the amount of processing that needs to be further completed by the second (image processing) procedure. For example, contribution of actions information of the image processing summary informs the second (image processing) procedure of the processing work that has already been completed and of the results of that work. As a result, the second (image processing) procedure avoids performing work previously performed and makes use of the results of work previously performed. Also, the first (image processing) procedure and the second (image processing) procedure contribute to a common valid symbol decoding result.

There are a variety of types of symbols that the scanner 120 can decode. The symbol type that is to be decoded determines the type and amount of work required to decode that symbol. Some symbols require multiple reads, also referred to as "votes" to assure a validity of the symbol. Composite symbols include separate parts that are all read to completely decode all data encoded by the symbol.

Figure 4:
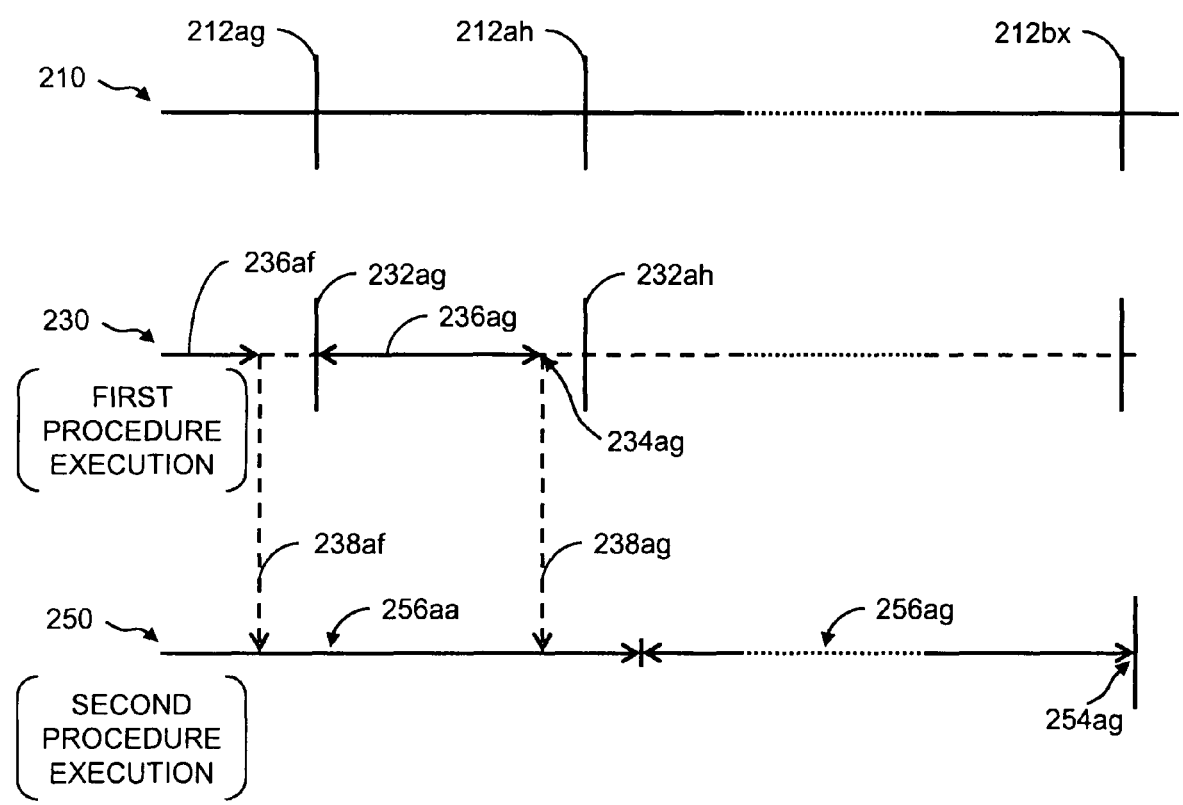
FIG. 4 illustrates a variation of the symbol decoding scenario of FIG. 2A including a transition of the second (image processing) procedure from processing a first image to processing another image of the current series of images in response to receiving a image processing summary from the first (image processing) procedure.

FIG. 4 illustrates a variation of the symbol decoding scenario of FIG. 2A including a transition of the second (image processing) procedure from processing a first image to processing a second image of the series of images in response to receiving a image processing summary from the first (image processing) procedure.

In this scenario, the first (image processing) procedure has been unable to successfully decode any of the approximately first 7 images of the current series of images. The first (image processing) procedure has completed processing of the sixth image of the current series during first elapsed period of time 236af and the seventh image of the series during first elapsed period of time 236ag, and communicated image processing summaries 238af and 238ag respectively.

Meanwhile, the second (image processing) procedure has been processing the first image of the series during a second elapsed period of time 256aa. In response to receiving the image processing summary 238ag, the second (image processing) procedure terminates processing of the second elapsed period of time 256aa and initiates another second elapsed period of time 256ag to process the seventh image of the current series. The second elapsed period of time completes at time 254ag.

The image processing summary 238ag includes a sufficiently higher rating of a likelihood of successfully decoding the seventh image of the current series as compared to the rating of a likelihood of successfully decoding the current (first) image of the current series.

In some embodiments, the second (image processing) procedure delays processing of any of the images of the current series until it receives a image processing summary from the first (image processing) procedure having a sufficiently high rating. In other embodiments, the second (image processing) procedure delays processing until it receives a minimum number of image processing summaries, and then selects a highest rated image of the minimum number of images, to process.

While the present invention has been explained with reference to the structure disclosed herein, it is not confined to the details set forth and this invention is intended to cover any modifications and changes as may come within the scope and spirit of the following claims.

We claim:

1. An apparatus for decoding a graphic symbol comprising:
 a hand held imaging device including one or more processors and configured to capture a series of images according to a schedule of image capture over time, and wherein each said image can include a unique digital representation of at least a portion of at least one graphical symbol;
 a first procedure that is configured to perform a first set of one or more actions during its execution while directing control of at least one of said one or more processors, said first set of one or more actions are configured for processing an image that can include at least a portion of a graphical symbol, and wherein said execution occurs during a first elapsed period of time;
 a second procedure that is configured to perform a second set of one or more actions during its execution while directing control of at least one of said one or more processors, said second set of one or more actions are configured for processing an image that can include at least a portion of a graphical symbol, and wherein said execution occurs during a second elapsed period of time; and wherein a duration of said first elapsed period of time is constrained to be less than a first amount of time while a duration of said second elapsed period of time is not constrained to said first amount of time.

2. The apparatus of claim 1 wherein said first procedure is configured to execute with more frequency than said second procedure during a span of time within which a series of images can be captured.

3. The apparatus of claim 1 wherein said first procedure is configured for processing, at least in part, more images than said second procedure during a span of time within which a series of images can be captured.

4. The apparatus of claim 1 wherein said first elapsed period of time is constrained according to a schedule of image capture over time.

5. The apparatus of claim 1 wherein said actions for processing include at least a portion of an attempt to decode an image that may be included within said image.

6. The apparatus of claim 1 wherein said first procedure processes, at least in part, each of said series of images until any one of said images is successfully decoded by said first or said second procedure.

7. The apparatus of claim 1 wherein said second procedure is performed upon at least one of said series of images until any one of said images is successfully decoded by said first procedure or said second procedure.

8. The apparatus of claim 1 wherein information describing a performances of said first procedure upon any of said series of images is included within a communication that is accessible to said second procedure.

9. The apparatus of claim 8 wherein an interruption of said second procedure is performed and wherein said information is communicated to said second procedure in association with said interruption.

10. The apparatus of claim 8 wherein said information includes a description of a contribution of actions towards at least a partial attempt of decoding at least a portion of said graphical symbol.

11. The apparatus of claim 10 wherein said contribution of actions describes results of one or more reads of at least a portion of said graphical symbol.

12. The apparatus of claim 10 wherein said contribution of actions describes a rating of at least a portion of said graphical symbol and wherein said rating is configured to have a correlation with a likelihood of successfully decoding said symbol.

13. The apparatus of claim 10 wherein said first procedure completes a successful decode of said at least one graphical symbol and said contribution of actions describes said successful decode.

14. The apparatus of claim 13 wherein said second procedure elects to terminate or to not terminate in response to said communication of said successful decoding.

15. The apparatus of claim 1 wherein said second procedure communicates an image processing summary that is accessible to said first procedure.

16. The apparatus of claim 15 wherein execution of said first procedure is terminated and said first procedure ceases attempts to perform processing upon any other images within said series of images in response to said image processing summary that indicates a successful decode of an image of the series of images.

17. The apparatus of claim 15 wherein execution of said first procedure is un-suspended and re-initiated to proceed to perform processing upon other images within said series of images in response to said processing summary that indicates an unsuccessful decode of an image of the series of images.

18. The apparatus of claim 1 wherein information describing an image processing forecast is included within a communication from said second procedure that is accessible to said first procedure.

19. The apparatus of claim 18 wherein execution of said first procedure is suspended or terminated and said first procedure ceases processing upon any other images within said series of images in response to said image processing forecast that indicates that there is a sufficiently high likelihood that said second procedure will successfully decode an image.

20. A method for decoding a graphic symbol comprising:
providing a hand held imaging device including one or more processors and configured to capture a series of images according to a schedule of image capture over time, and wherein each said image can include a unique digital representation of at least a portion of at least one graphical symbol;
configuring said imaging device to execute a first procedure that that is configured to perform a first set of one or more actions during its execution while directing control of at least one of said processors, said first set of actions are configured to include at least a portion of a set of actions that are directed for processing an image that can include at least a portion of a graphical symbol, and wherein said execution occurs during a first elapsed period of time;
configuring said imaging device to execute a second procedure that is configured to perform a second set of one or more actions during its execution while directing control of at least one of said processors, said second set of actions are configured to include at least a portion of a set of actions that are directed for processing an image that can include at least a portion of a graphical symbol, and wherein said execution occurs during a second elapsed period of time; and wherein a timing of initiation and duration of said first elapsed period of time is constrained to be less than a first amount of time while a duration of said second elapsed period of time is not constrained to said first amount of time.

* * * * *